3,465,334
ROTARY ELECTROMAGNETIC
INDICATOR DEVICE
Arnold H. Cohen, Park Ridge, and Leonard C. Pursiano, Ridgewood, N.J., assignors to The Bendix Corporation, a corporation of Delaware
Filed Apr. 22, 1968, Ser. No. 723,009
Int. Cl. G09f 11/02
U.S. Cl. 340—378                          10 Claims

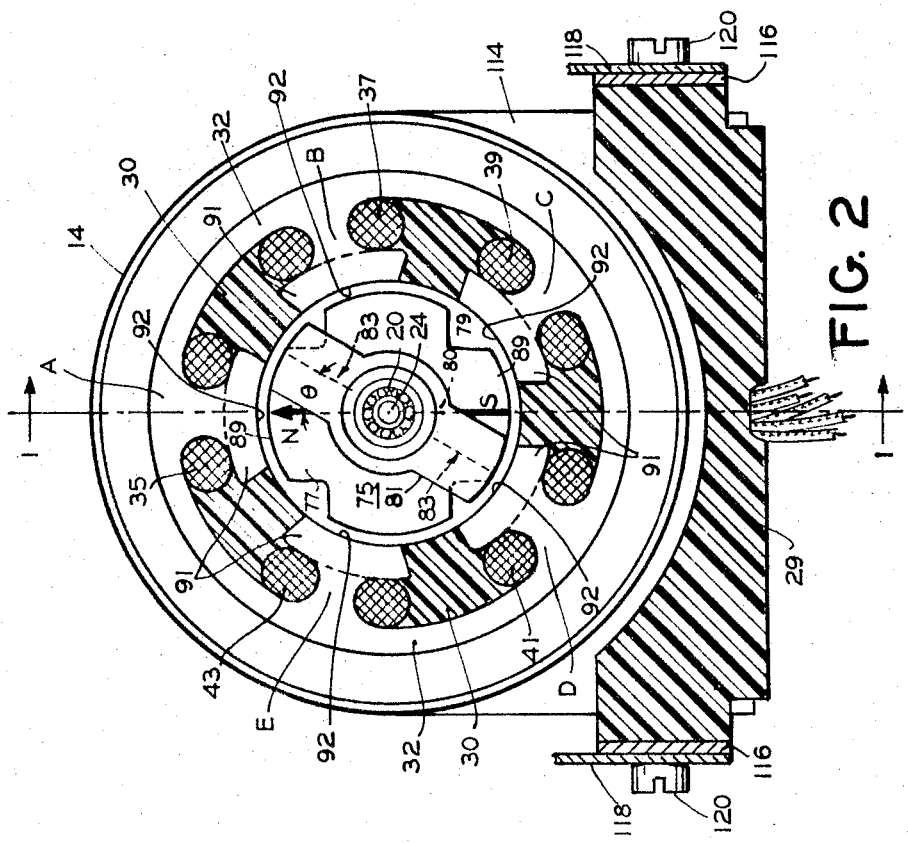
Sept. 2, 1969  A. H. COHEN ET AL  3,465,334
ROTARY ELECTROMAGNETIC INDICATOR DEVICE
Filed April 22, 1968   3 Sheets-Sheet 1
INVENTORS
ARNOLD H. COHEN
LEONARD C. PURSIANO
BY Herbert L. Davis
ATTORNEY Sept. 2, 1969   A. H. COHEN ET AL   3,465,334
ROTARY ELECTROMAGNETIC INDICATOR DEVICE
Filed April 22, 1968   3 Sheets-Sheet 2
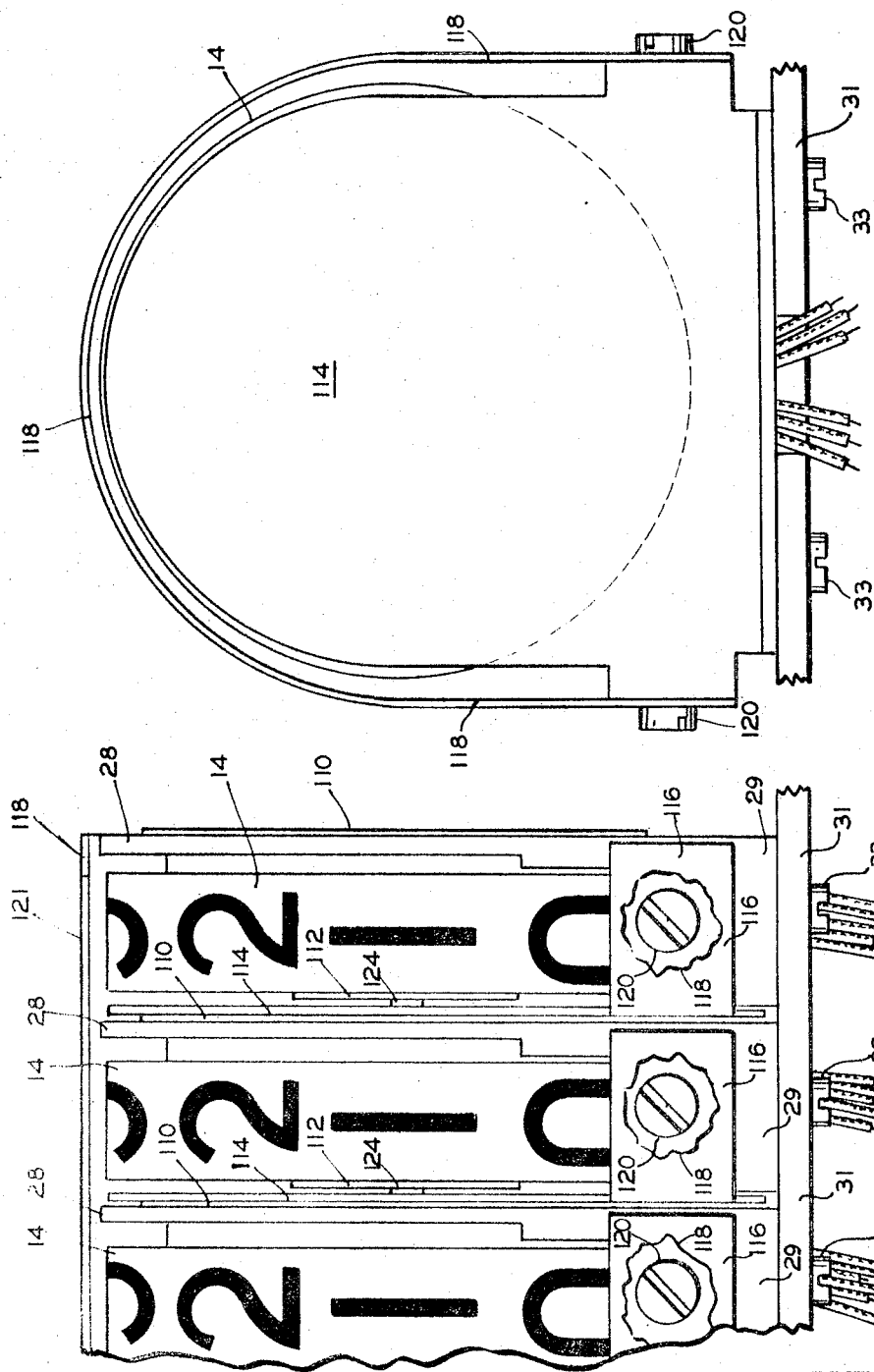
INVENTORS
ARNOLD H. COHEN
LEONARD C. PURSIANO
BY Hubert L. Harris
ATTORNEY INVENTORS
ARNOLD H. COHEN
LEONARD C. PURSIANO
BY Herbert L. Davis
ATTORNEY United States Patent Office 3,465,334
Patented Sept. 2, 1969

ABSTRACT OF THE DISCLOSURE

An electromagnetic indicator device including a plurality of electrically actuated indicators for positioning a plurality of discrete numbers or symbols on rotating drums by electrical pulses selectively applied to energize controlling electromagnets is disclosed. The device is a miniature or relatively narrow width indicator including a novel shunting means to prevent intermittent "hang-up" in selectively positioning indicia on drums to be angularly displaced one hundred and eighty degrees. Suitable shielding means are included to prevent coupling or interaction between permanent magnet rotors of adjacent indicator devices. Novel L shaped electromagnetic stator pole pieces provide greater magnetic effect on a permanent magnet rotor for driving the indicator drum of each of the relatively narrow width indicator devices.

CROSS-REFERENCE TO RELATED APPLICATIONS

The present invention relates to improvements in an electromagnetic indicator device of a type such as disclosed and claimed in a copending U.S. application Ser. No. 448,084, filed Apr. 14, 1965 by Leonard C. Pursiano and Arnold H. Cohen, the joint inventors of the present invention, and now U.S. Patent No. 3,392,382, granted July 9, 1968, and assigned to The Bendix Corporation assignee of the present invention.

BACKGROUND OF THE INVENTION

Field of the invention

This invention relates to an electromagnetic indicator device and more particularly to improvements in an electromagnetic indicator device so as to effect a relatively narrow width indicator device and an improved arrangement in a multiple assembly of such indicator devices with suitable shielding to prevent excessive magnetic motive cross coupling or interaction between adjacent electromagnetic indicator devices so as to provide reliable operation at such varying angular positions of the devices as may be effected in the maneuvers of an aircraft.

Description of the prior art

Heretofore, as described and claimed in the U.S. Patent No. 3,392,382, there has been provided an electromagnetic indicator embodying a five-pole electromagnetic assembly including selectively energized electromagnetic windings and a two-pole permanent magnet rotatably mounted in cooperative relation therewith, together with a novel pole piece affixed to the rotatable permanent magnet and so arranged in relation thereto and to the five-pole electromagnetic assembly as to eliminate discrepancies upon the selective energization of the electromagnetic windings for positioning in relation to a viewing window numbers or indicating symbols borne by a rotatable indicator drum driven by the permanent magnet, in that the permanent magnet is so poled that one pole is magnetized in alignment with the other, while the novel pole piece may be formed of ferromagnetic material mounted on a permanent magnet rotor and having a magnetic axis displaced from the magnetic north-south pole axis of the permanent magnet by a small angle of, for example, twenty-five degrees so as to produce in cooperation with the poles of the five-pole electromagnetic assembly a detent action and a resultant magnetic field in which is combined the magnetic forces generated by the permanent magnet rotor and the detent action pole piece so as to cause an angular displacement of the permanent magnet rotor out of alignment with the dominating coacting pole of an electromagnetic winding upon selective energization thereof and thereby prevent ambiguity in the selective positioning of the numbers or indicating symbols borne by the drum.

In such prior type indicator devices, it has been found that when the structure thereof is applied in a miniature or relatively narrow width indicator that there may result an intermittent "hang-up" in the operation of the rotor to effect displacement of indicia thereon one hundred and eighty degrees due to an insufficiently developed electromagnetic torque. Further, it has been found that the structure of such prior type indicator devices when embodied in a close multiple assembly may effect an excessive cross magnetic coupling or interaction between the permanent magnet rotors of adjacent electromagnetic indicator devices.

Furthermore, accurate adjustment of the magnetic detent effect by the changing of the angular position of a single shunt element in such a miniature or relatively narrow width indicator device has been found to be quite difficult in order to effect therein a desired detent operation, and furthermore the structure of such prior type electromagnetic indicator device as applied to extremely small size indicators are subject to non-reliable operation under such varying angular positions of the electromagnetic indicator device as may be experienced in flight maneuvers of an aircraft carrying the indicator.

The heretofore noted problem areas of the prior type device have been overcome by the specific structural arrangement of the present invention through the provision of novel L-shaped stator pole pieces so arranged in relation to the permanent magnet rotor as to effect in the miniature and relatively narrow width indicator sufficiently developed electromagnetic torque as to provide intermittent "hang-up" in the operation of the magnetic rotor to effect a displacement of indicia thereon of one hundred and eighty degrees. Further, there are arranged at opposite sides of the permanent magnet rotor and in cooperative relation with the novel L-shaped stator pole pieces a pair of magnetic shunting members which may be angularly positioned relative to the permanent magnet rotor and to each other so as to effect an accurate adjustment of the magnetic detent effect.

Further, to facilitate a compact assembly of a plurality of the miniaturized or relatively narrow width electromagnetic indicators, there are provided novel magnetic shielding means between each of the indicator devices including a magnetic shield at one end thereof attached to a stator assembly of the indicator device, another shield attached to the dial and hub assembly at an opposite end of the indicator device and an additional end plate shield attached to the stator assembly and extending at said opposite end thereof so as to effectively shield each of the multiple indicator devices from magnetic cross coupling or interaction between adjacent permanent magnet rotors of the respective indicator devices.

Furthermore, in the specific structural arrangement of the present invention, there are provided two hardened polished steel spacers arranged at opposite sides of an indicator drum carried by a hub assembly with one spacer being positioned between a bearing at one side of the hub assembly and a side plate, and the other spacer being positioned between a bearing at an opposite side of the hub assembly and another side plate so that non-reliable operation of the indicator drum of the electromagnetic device in an "upside-down" position and at other extreme tilt angle positions thereof may be effeitcvely overcome in that the relative position between the permanent magnet rotor and the stator of the indicator device after adjustment in a horizontal position may be maintained at all such other positions and tilt angles through the provision of the pair of hardened polished steel spacers.

The foregoing specific structural arrangement of the present invention serves to overcome the aforenoted problem areas in the prior electromagnetic indicator device as applied to a miniaturized or relatively narrow width indicator and the multiple assembly thereof; and thus the present invention relates to distinctly different problems and idea of means for the solution of such problems and as to which the prior type indicators have evidenced no recognition of such problems much less any idea of means for the solution thereof.

SUMMARY OF THE INVENTION

In the instrumentation of a miniature or relatively narrow width indicator device to which the present invention is directed, in order to prevent inaccuracies in the operation thereof and to develop sufficient magnetic operating torque to prevent in such a relatively narrow width indicator device an intermittent "hang-up" in the relative displacement of the rotor element and indicia thereon one hundred and eighty degrees, and further to facilitate a multiple assembly of such relatively narrow width electromagnetic indicator devices so as to prevent cross magnetic motive coupling or interaction between permanent magnet rotors of sdjacent indicators, an object of the present invention is to provide an improved structural arrangement for a miniature or relatively narrow width electromagnetic indicator device to effectuate the foregoing.

Therefore, an object of the invention is to provide an electromagnetic indicator having a permanent magnet rotor including cooperating outer faces of a width substantially equal to that of the width of the inner face of the coacting pole shoe of each electromagnetic stator pole leg of the indicator and substantially greater than the width of the pole leg so as to permit winding room for the electromagnetic coils within the confines of a narrow width indicator and on each pole leg.

Another object of the invention is to provide a stator pole piece for electromagnetic control windings of the indicator in a substantially L shape with a right angle shoe element projecting from a leg of the L-shaped pole piece providing an inner face of each stator pole piece arranged in cooperative relation with an outer face of a permanent magnet rotor so as to effect sufficient electromagnetic torque to effectuate the desired operation of the indicator.

Another object is to provide such an electromagnetic stator pole piece of an L shape so as to effectively center the permanent magnet rotor between end plates of the indicator by the provision of a soft iron shoe centrally arranged in relation to the end plates to cause the permanent magnet to be magnetically centered within the confines of the pole shoe.

Another object of the invention is to provide novel miniature or relatively narrow width electromagnetic indicator devices in a compact assemblage, including a first electromagnetic shield attached to the stator of the indicator device at one side thereof, a second electromagnetic shield attached to the drum and hub assembly of the indicator device at an opposite side thereof, and a third electromagnetic shield attached to said stator assembly and positioned at said opposite side of the indicator device in spaced relation to said second shield so as to prevent magnetic motive cross coupling or interaction between magnetic motive operating forces of adjacent indicators so that upon the permanent magnet rotor of one of the energized indicator devices changing position such operation does not effect the position of permanent magnet rotors in adjacent indicators in a deenergized state.

Another object of the invention is to provide an electromagnetic indicator device of the aforenoted type in which there is provided a pair of magnetic shunting members one on each side of the permanent magnet rotor and arranged in cooperative relation with the inner face of the shoe of the L-shaped electromagnetic core elements so that adjustment of the magnetic detent action provided by the shunt members may be readily facilitated with great accuracy by the angular positioning of the pair of shunt members relative one to the other and to the permanent magnet rotor member so as to allow a greater flexibility in the magnetic detent adjustment.

A further object of the invention is to provide a fixed shaft extending from one side plate of the indicator device to an opposite side plate for rotatably supporting thereon bearings of the permanent magnet rotor and including a pair of hardened polished steel spacers on each side of an indicator drum and hub assembly of the permanent magnet with one spacer being positioned between a bearing of the hub assembly and one side plate of the indicator device and the other spacer being positioned between an opposite side plate of the indicator device and a bearing at an opposite side of the hub assembly with the spacers cooperating with the bearings at tilt angle positions of the indicator device so as to prevent non-reliable or accidental displacement of the indicator drum due to resultant gravitational forces generated thereby.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended drawings for this purpose.

IN THE DRAWINGS

FIGURE 1 is a cross sectional view of an indicator embodying the invention and taken along the lines 1—1 of FIGURE 2 and looking in the direction of the arrows.

FIGURE 2 is a sectional view of FIGURE 1 taken along the lines 2—2 of FIGURE 1 and looking in the direction of the arrows with the rotor of the indicator in a position typical of that effected upon the field windings being in a deenergized state immediately following deenergization of the field winding of pole A.

FIGURE 3 is a fragmentary wide view of an assemblage of a plurality of the electromagnetic indicator devices shown in FIGURES 1 and 2.

FIGURE 4 is an end view of the indicator assembly of FIGURE 3 showing a masking cover in assembled position.

DESCRIPTION OF THE INVENTION

Figure 5:
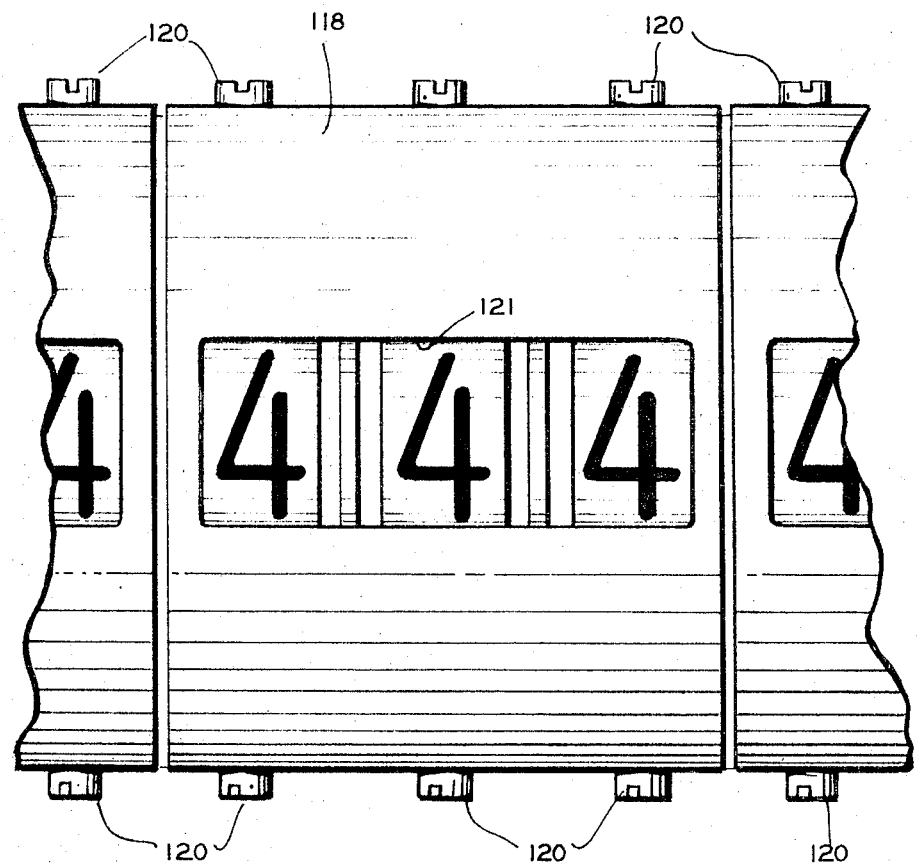
FIGURE 5 is a top plan view of the indicator assembly of FIGURES 3 and 4 showing an indicator slot or window in operative relation for viewing indicia on the respective indicator drums.

Referring to the drawings of FIGURES 1, 2 and 3, an electromagnetic indicator device constructed in accordance with the invention is shown as including a rotary indicating member or drum 14 on which there may be provided a plurality of equally spaced numbers or indicia symbols, as shown in FIGURE 3.

The drum 14 is formed of a lightweight non-magnetic material such as aluminum which is centrally secured at 16 to a radial flange 17 projecting from one end of a hub assembly 18 carried by jewel or other suitable bearings 20 and 22 mounted in bearing retainers 21 and 23 positioned at opposite sides of the hub assembly 18 and rotatably supporting the hub 18 on a shaft 24 which has a flange 25 and end portion 26 projecting therefrom and secured in a side plate 28 having fixedly mounted therein an electrical insulating block 30 formed of a suitable plastic electrical insulating material. The side plate 28 has a base portion 29 which may be in turn mounted on a base plate 31 by suitable fastening screws 33. The plastic electrical insulating material or block 30 may be of a suitable epoxy material and serves to encapsulate on the side plate 28 a five-pole stator indicated generally in the drawing of FIGURE 1 by the numeral 32 and which may be formed of either laminated or solid magnetic iron.

Projecting radially inward from the stator 32 are the poles A, B, C, D and E, as shown in FIGURE 2 and further wound about the respective poles A, B, C, D and E are main electromagnetic windings or coils 35, 37, 39, 41 and 43, shown structurally in FIGURES 1 and 2.

As explained in the aforenoted U.S. application Ser. No. 448,084, each of the coils 35, 37, 39, 41 and 43 may be selectively connected by suitable control switches to a source of electrical energy for effecting selective energization of the electromagnetic control coils 35, 37, 39, 41 and 43 on the poles A, B, C, D and E to provide the desired controlling action, as therein explained.

In this connection, it should be noted that the five poles A, B, C, D and E are equally angularly spaced about a rotatable permanent magnet 75 carried by the hub assembly 18 and having aligned opposed poles 77 and 79 cooperatively arranged in relation to the electromagnetic poles A, B, C, D and E. The rotatably permanent magnet 75 is secured to the hub 18, as shown in FIGURE 1, and the magnet 75 is so arranged that one pole 77, for example, the north pole, is magnetized in alignment with an opposite pole 79, or south pole, as indicated in FIGURE 2 so as to provide a magnetic axis 80.

In addition, in the improved rotor of the present invention, there are provided a pair of shunting bars 81 and 82 of soft iron or suitable ferromagnetic or low magnetic retentivity material frictionally engaging the hub 18 of the permanent magnet 75 and positioned at opposite sides of the permanent magnet with an axis 83 of the bars 81 and 82 being displaced from the north and south magnetic axis 80 by a small angle $\varphi$ of, for example, approximately twenty-five degrees (25°), as shown in FIGURE 2, and which may be of a slightly different angular relation for each of the bars 81 and 82. The releasable frictional engagement of the hub 18 by the bars 81 and 82 provides means whereby the bars 81 and 82 may be angularly adjusted and precisely set by the operator in relation one to the other preparatory to operation so as to provide a more accurate detent action. Each of the bars 81 and 82 may be angularly adjusted in the frictional engagement at the opposite ends of the hub 18 so as to provide an angular adjustment of one bar relative to the other bar to effect an accurate detent action through the provision thereby of a leakage of magnetic flux in an adjusted looped leakage path about the opposite ends of the permanent magnet 75.

Thus, when coil 35 is energized to effect the magnetization of the pole A to call for position 1, a magnetic field is set up in the stator whose magnitude and position is determined by the excitation applied to coil 35 of pole A. The permanent magnet rotor 75, conventionally magnetized with both North and South poles along the same axis 80, together with the shoft iron shunting members 81 and 82 frictionally engaged with the hub 18 and at opposite sides of the permanent magnet 75, will be attracted to the stator pole A excited by coil 35. However, the North-South axis 80 of the permanent magnet 75 will not line up with the center line of pole A because of the magnetic shunting effect of the angularly adjustable soft iron members 81 and 82 at opposite sides of the permanent magnet 75 providing a magnetic flux leakage through a looped path provided thereby.

Thus the axis 80 of the magnet 75 will be displaced from the center line of pole A by an amount $\theta$, this detent angle being dependent upon the angular positions ($\phi$) of the respective soft iron pieces 81 and 82 with respect to the axis 80 of the magnet 75. Thus, position 1 is determined. When the excitation is removed from coil 35 of pole A, the parmanent magnet rotor 75 will change position by an amount $\theta$ and the axis of the magnet 75 will line up with the center line of pole A, as shown in FIGURE 2. Magnetic detent is achieved and the rotor will hold its position with power off.

When position 6 is called for, the excitation of coil 35 of pole A is reversed, as explained in the U.S. Patent No. 3,392,382, and a magnetic field will be created in the stator 180 degrees displaced from position 1. A turning couple will be developed on the permanent magnet rotor 75, due to the magnetic detent action by the members 81 and 82 toward pole A, and thus the rotor North pole will line up in a new position $\theta$ degrees displaced from the midpoint of poles C and D. At position 6, when the power is removed (see FIGURE 2), the permanent magnet rotor 75 will again rotate clockwise by an angle $\theta$ and align itself with the center line of pole A or the midpoint between poles C and D.

If this magnetic detent does not exist, the turning couple in going from position 1 to 6 will be equal in either direction, resulting in a zero torque or an unstable equilibrium condition and hence no movement. Thus it can be seen that with ten (10) detent positions and ten (10) excited positions, display of information can be maintained in either the energized or deenergized states, and the scale will be uniform with all ten numbers equally spaced from each other around the drum.

The system can also be operated from a common polarity source, exciting one coil for some positions and two coils of the same polarity for alternate positions as explained in the U.S. Patent No. 3,392,382. For example, position 1 can be obtained by exciting coils 35 and 37 of poles A and B and number 6 can be positioned by energizing coil 41 of Pole D with the same polarity. Magnetic detent action is developed in a manner similar to that described for the indicator using alternate polarity excitation.

In the prior device of U.S. Patent No. 3,392,382, the magnetic detent action is effected solely by the angular position of a fixedly mounted single magnetic shunting member. In the present invention, however, by the provision of the pair of magnetic shunting members 81 and 82 in releasable frictional engagement with the hub 18 and at opposite sides of the permanent magnet 75, there is provided a means whereby an adjustment of the magnetic detent effect is facilitated by the angular adjustment of each of the pair of magnetic shunting members 81 and 82 relative one to the other and to the permanent magnet 75, thus allowing for greater flexibility and accuracy in the magnetic detent adjustment. Thus one shunt member 81 may be arbitrarily frictionally engaged with the hub 18 at an approximate angular position to effect the desired detent action while the other shunt member may be angularly positioned in a vernier action with respect to the permanent magnet 75 and the first shunt member 81 so as to accurately set the detent position and facilitate the precise magnetic detent adjustment.

Furthermore, the disadvantages of the structural arrangement of the prior device disclosed in U.S. Patent No. 3,392,382, as applied to a miniature or relatively narrow width indicator, has been found to reside in an intermittent "hang-up" in the operation of the indicator which has been attributed to insufficient electromagnetic operating torque.

This problem has been solved in the present invention by the provision of a permanent magnet having cooperating outer end surfaces of a width substantially equal to that of inner cooperating surfaces of the electromagnetic pole shoes; the pole shoes being of a width substantially greater than the width of the pole legs so as to permit winding room for the electromagnetic coils within the confines of a narrow width indicator and increase the effective torque produced between the respective rotor and stator elements of the indicator.

Moreover, it was found that when the structure of the prior device was applied to a miniature or relatively narrow width electromagnetic indicator device, the space requirements were such that the width of the stator in such prior structure could not be increased sufficiently to meet the required electromagnetic power requirements.

However, in the present invention, a permanent magnet 75 having a relatively wider outer surface 89 is utilized in conjunction with the arcuate inner surfaces of the electromagnetic cores A, B, C, D and E each of which has a novel L-shaped core including a leg 90 and a shoe element 91 projecting from an inner end of the leg of the L-shaped core providing an arcuate inner surface 92, as shown by FIGURE 2, of a width substantially equal, as shown by FIGURE 1, to the width of the outer ends 89 of the cooperating permanent magnet rotor 75 so as to thereby more effectively marry the stator magnetic core with the permanent magnet rotor 75 and provide through the shunting members 81 and 82 an effective return path for the magnetic flux which is maintained within the confines of the relatively narrow width permitted by the miniature indicator.

As a result, it was found that the novel L shaped magnetic cores may be effectively coupled with the permanent magnet rotor 75 substantially equal in width to the shoe elements 91 projecting from the inner end of the legs 90 of the L-shaped magnetic cores so as to produce sufficient electromagnetic torque to prevent a "hang-up" of the permanent magnet 75 and assure reliable operation of the electromagnetic indicator device.

As shown by FIGURES 3, 4 and 5, a multiplicity of such electromagnetic indicator devices, one of which is shown in detail in FIGURES 1 and 2, may be mounted in a compact assembled relation on a base plate 31 by the fastening screws 33 being screw threadedly engaged in the base portion 29 of the electromagnetic indicator. In order to prevent cross coupling by magnetic motive interaction between the permanent magnet rotors of adjacent indicators mounted in the close compact assemblage, there has been provided in the present invention novel magnetic shielding means. Moreover, the novel L-shaped stator magnetic cores and the larger rotatable permanent magnet 75 produce an increased holding torque so as to minimize interaction between the respective indicators.

Further magnetic motive interaction between the elements will be prevented through the use of the magnetic shielding arrangement, shown in FIGURES 1 and 3, in which a soft iron magnetic shield 110 is suitably attached by cement to an outer surface of the side plate 28 of the stator assembly, another soft iron magnetic shield 112 is suitably attached by cement to the indicator drum 14 and hub 18 assembly at an opposite side of the indicator device, while a third soft iron end plate shield 114 is attached at the opposite side of the indicator device by suitable ears 116, as shown by FIGURE 3, which together with a masking cover 118 are attached by fastening bolts 120 to the base portion 29 of the indicator device. The masking cover 118 includes a longitudinal slot or window 121 through which any one of a plurality of equally spaced numbers or indicator symbols on the several drums 14 of the indicators in the compact assemblage may be viewed, as shown by FIGURES 3 and 5.

In the present invention then, upon energization of an electromagnetic coil in one indicator causing the permanent magnet 75 thereof to change its effective angular position, such action will not alter the position of corresponding parts in adjacent indicators in the compact indicator assembly and which may be in an energized or deenergized state.

Further, in order to prevent non-reliable operation of the electromagetic indicator device in, for example, a so-called "upside-down" position and at other tilt angles to which the indicator device may be subjected by flight maneuvers of an aircraft in which the same may be carried, there has been provided in the present invention two hardened polished steel spacers 122 and 124 mounted, as shown in FIGURE 1, at opposite sides of the drum 14 and hub 18 assembly freely rotatable on the shaft 24. The spacer 122 is positioned between the bearing 20 at one side of the hub assembly 18 and the flange 25 of the shaft 24 mounted adjacent the side plate 28, while the spacer 124 is positioned at an opposite side of the hub assembly 18 between the bearing 22 and the side plate or shield 114 so that the spacers 122 and 124 are effectively trapped in an operative position by the side plate 28 and shield 114 so as to provide friction surfaces coacting with the bearings 22 and 24 to prevent an accidental displacement of the hub assembly 18 in any position of the indicator.

The relative axial position between the permanent magnet 75 and the electromagnetic stator after magnetic detent adjustment in a horizontal position is effectively maintained in all subsequent positions and tilt angles of the indicator by the friction surfaces of the two hardened polished steel spacers 122 and 124 which frictionally cooperate with the bearings 22 and 24 to prevent non-reliable or accidental displacement of the indicator drum 14 in a so-called "upside-down" or other tilt angle positions which due to the arrangement of the spacers 122 and 124 is uneffected by the gravitational forces which may be developed by the off-angled position of the indicator device.

Through the foregoing structural arrangement of the improved electromagnetic indicator device of the present invention, the aforenoted problems in a miniature or relatively narrow width indicator in a compact assemblage may be avoided.

What is claimed is:

1. In an electromagnetic indicator device for displaying a plurality of discrete indicia in response to electrical energization, said indicator device being of a type including a permanent magnet, means supporting the permanent magnet for rotation about an axis of rotation thereof to a plurality of discrete angularly spaced positions, at least one main electromagnetic coil, and the main coil being mounted at one side of said axis of rotation with an axis of the coil extending in a direction substantially perpendicular to the axis of rotation of said magnet; the improvement comprising a pair of magnetic shunting members, one of said magnetic shunting members being positioned at one side of the permanent magnet and the other of said pair of magnetic shunting members being positioned at an opposite side of the permanent magnet, said pair of magnetic shunting members extending in angular relation to said permanent magnet, said permanent magnet including a hub portion, and at least one of said shunting members including means for releasably engaging said hub portion so as to permit an angular adjustment of the position of said one shunting member relative to the other of said pair of shunting members to provide magnetic paths extending in an angular relation of less than ninety degrees to a magnetic axis of said premanent magnet and along opposite sides of the permanent magnet so that upon selective energization of said main coil with electrical signals of either of two opposed polarities angular movement of said permanent magnet about the axis of rotation thereof may be effected from a first position to a second position dependent upon the relative angular adjustment of the position of said one shunting member, said magnetic shunting members providing paths at opposite sides of the permanent magnet for a flow of magnetic flux resulting upon energization of the main coil, thereby producing a turning moment of said permanent magnet, and the direction of angular movement of said permanent magnet about the axis of rotation thereof being in a sense predetermined by the angular relation of the axes of said magnetic shunting members to the magnetic axis of said permanent magnet.

2. The improvement defined by claim 1 including a magnetic core for mounting said main coil in the indicator device, said core having a leg and a shoe element at an inner end of the leg with a width substantially greater than the leg and providing an inner arcuate surface arranged in cooperative relation with outer end surfaces of the rotatable permanent magnet, and the outer end surfaces of the permanent magnet having a width substantially equal to that of the width of the inner arcuate surface of the shoe element to effect a magnetic torque upon the selective energization of the main coil to pull the rotatable permanent magnet to the second position.

3. The improvement defined by claim 1 including a substantially L-shaped magnetic core for mounting the main coil in the indicator device, the L-shaped core including a leg for supporting the main coil and a shoe element, the shoe element extending from an inner end of the leg to provide an inner arcuate surface arranged in cooperative relation with outer end surfaces of the rotatable permanent magnet, and the outer end surfaces of the permanent magnet having a width substantially equal to the width of the inner arcuate surface of the shoe element to effect a magnetic torque upon the energization of the main coil to pull the rotatable permanent magnet to the second position dependent upon the relative angular adjustment of the shunting members at opposite sides of the permanent magnet and extending in cooperative relation with the inner arcuate surface of the shoe element of the L-shaped magnetic core.

4. A compact multiple assembly of electromagnetic indicator devices, each of said indicator devices being of a type defined by claim 1 in which each indicator device includes a stator assembly for mounting the main electromagnetic coil, a magnetic shield attached to the stator assembly at one side of the indicator device, a second magnetic shield attached to the hub of the rotatable permanent magnet at an opposite side of the indicator device, and a third magnetic shield attached to the stator assembly at said opposite side of the indicator device and in spaced relation to the second magnetic shield, and said first, second and third magnetic shields serving to prevent magnetic interaction between adjacent indicator devices of said compact multiple assembly.

5. A compact multiple assembly of electromagnetic indicator devices, each of said indicator devices being of a type defined by claim 1 in which each indicator device includes a side plate, a stator assembly carried by the side plate for mounting the main electromagnetic coil, the means supporting the permanent magnet for rotation including a fixed shaft projecting inwardly from the side plate, bearing means carried by the shaft for rotatably supporting the permanent magnet thereon at opposite sides thereof, an indicator drum operatively connected to the hub portion of the permanent magnet for rotation therewith, a first magnetic shield attached at an outer side of the side plate, a second magnetic shield attached to the indicator drum and hub portion of the permanent magnet at an opposite side thereof from said side plate, a base element projecting inwardly from a lower end of the side plate, and a third magnetic shield attached to said base element and extending upwardly from the base element at an opposite side thereof from said side plate and in a parallel spaced relation to the second magnetic shield, a pair of spacer elements, one of said spacer elements being positioned between the bearing means at one side of the hub portion and the side plate, and the other of said spacer elements being positioned between the bearing means at an opposite side of the hub portion and the third magnetic shield, the first and second spacer elements being arranged in frictional cooperative relation with the respective bearing means so as to prevent accidental angular displacement of the hub portion and indicator drum operatively connected thereto by gravitational forces developed at angular tilt positions of the compact multiple indicator assembly, and the first, second and third shields serving to prevent magnetic interaction between adjacent indicator devices of said compact multiple assembly.

6. A compact multiple assembly of electromagnetic indicator devices as defined by claim 5 in which each indicator device includes a substantially L-shaped magnetic core for mounting the main coil in the indicator device, the L-shaped core including a leg for supporting the main coil and a shoe element, the shoe element extending from an inner end of the leg to provide an inner arcuate surface arranged in cooperative relation with outer end surfaces of the rotatable permanent magnet, and the outer end surfaces of the permanent magnet having a width substantially equal to the width of the inner arcuate surface of the shoe element to effect a magnetic torque upon the energization of the main coil to pull the rotatable permanent magnet to the second position dependent upon the relative angular adjustment of the shunting members at opposite sides of the permanent magnet and extending in cooperative relation with the inner arcuate surface of the shoe element of the L-shaped magnetic core.

7. In an electromagnetic indicator device for displaying a plurality of discrete indicia in response to electrical energization, said indicator device being of a type including a permanent magnet rotor supported for deflection about an axis of rotation thereof to a plurality of discrete angular spaced positions, a plurality of main electromagnetic coils, the main coils being positioned around magnetic cores equally angularly spaced about said rotor axis and extending radially in a direction substantially perpendicular to the axis of rotation of said rotor; the improvement comprising first and second bars of low magnetic retentivity material adjustably mounted on said permanent magnet rotor and extending radially at opposite sides thereof and in adjustable angular relation to the permanent magnet rotor, said bars providing paths for magnetic flux caused by energization of the main coils, thereby producing a turning moment dependent upon the adjustable angular relation of the bars to the permanent magnet rotor, means to selectively energize said main coils with an electrical signal, said permanent magnet rotor being deflected to an angular position in accordance with a magnetic field generated by the energized main coil and in an angular direction dependent upon the angular position of the first and second bars of low magnetic retentivity material in relation to the permanent magnet rotor 8. In an electromagnetic indicator device for displaying a plurality of discrete indicia in response to electrical energization, said indicator device being of a type including a permanent magnet, means supporting the permanent magnet for rotation about an axis of rotation thereof to a plurality of discrete angular spaced positions, a plurality of main electromagnetic coils, the main coils being positioned around magnetic cores equally angularly spaced about said axis of rotation and extending radially in a direction substantially perpendicular to the axis of rotation of said permanent magnet; the improvement comprising magnetic shunting means of low magnetic retentivity material mounted on said permanent magnet and extending radially in an angular relation to the permanent magnet, said shunting means providing a path for magnetic flux caused by energization of a main coil, thereby producing a turning moment dependent upon the angular relation of the shunting means to the permanent magnet, means to selectively energize said main coils with an electrical signal, said permanent magnet being rotatable to an angular position in accordance with a magnetic field generated by the energized main coil and in an angular direction dependent upon the angular position of the shunting means of low magnetic retentivity material in relation to the permanent magnet, each of the magnetic cores being L-shaped and including a leg and a shoe element, the main coils being positioned around the legs of the L-shaped magnetic cores, and the shoe element extending from an inner end of the leg to provide an inner arcuate surface arranged in cooperative relation with outer end surfaces of the rotatable permanent magnet, and the outer end surfaces of the permanent magnet having a width substantially equal to the width of the inner arcuate surface of the shoe element to effect a magnetic torque upon the energization of the main coil to pull the rotatable permanent magnet to the second position dependent upon the relative angular relation of the shunting means to the permanent magnet, and said shunting means extending in cooperative relation with the inner arcuate surface of the shoe element of the L-shaped magnetic core.

9. A compact multiple assembly of electromagnetic indicator devices, each of said indicator devices being of a type defined by claim 8 in which each indicator device includes magnetic shielding means at opposite sides thereof to prevent magnetic interaction between adjacent indicator devices of said compact multiple assembly.

10. A compact multiple assembly of electromagnetic indicator devices, each of said indicator devices being of a type defined by claim 8 in which each indicator device includes a side plate, a stator assembly carried by the side plate and including the L-shaped magnetic cores mounting the main electromagnetic coils, the means supporting the permanent magnet for rotation including a fixed shaft projecting inwardly from the side plate, bearing means carried by the shaft for rotatably supporting the permanent magnet thereon at opposite sides thereof, an indicator drum operatively connected to the hub portion of the permanent magnet for rotation therewith, a first magnetic shield attached at an outer side of the side plate, a second magnetic shield attached to the indicator drum and hub portion of the permanent magnet at an opposite side thereof from said side plate, a base element projecting inwardly from a lower end of the side plate, and a third magnetic shield attached to said base element and extending upwardly from the base element at an opposite side thereof from said side plate and in a parallel spaced relation to the second magnetic shield, a pair of spacer elements, one of said spacer elements being positioned between the bearing means at one side of the hub portion and the side plate, and the other of said spacer elements being positioned between the bearing means at an opposite side of the hub portion and the third magnetic shield, the first and second spacer elements being arranged in frictional cooperative relation with the respective bearing means so as to prevent accidental angular displacement of the hub portion and indicator drum operatively connected thereto by gravitational forces developed at angular tilt positions of the compact multiple indicator assembly, and the first, second and third shields serving to prevent magnetic interaction between adjacent indicator devices of said compact multiple assembly.

References Cited

UNITED STATES PATENTS 3,392,382  7/1968  Pursiano _____ 340—378

JOHN W. CALDWELL, Primary Examiner

HAROLD I. PITTS, Assistant Examiner

U.S. Cl. X.R.

340—324, 325, 373; 335—219; 235—103